US012256669B2

(12) United States Patent
Forsman

(10) Patent No.: US 12,256,669 B2
(45) Date of Patent: Mar. 25, 2025

(54) ROBOTIC WORK TOOL WITH HEIGHT ADJUSTABLE CUTTING DISK AND METHOD FOR OPERATING A ROBOTIC WORK TOOL

(71) Applicant: HUSQVARNA AB, Huskvarna (SE)

(72) Inventor: Pär Forsman, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 692 days.

(21) Appl. No.: 17/525,038

(22) Filed: Nov. 12, 2021

(65) Prior Publication Data
US 2022/0151149 A1    May 19, 2022

(30) Foreign Application Priority Data

Nov. 13, 2020   (SE) .................... 2051332-1

(51) Int. Cl.
| A01D 34/74 | (2006.01) |
| A01D 34/00 | (2006.01) |
| A01D 34/64 | (2006.01) |
| A01D 75/18 | (2006.01) |
| A01D 101/00 | (2006.01) |

(52) U.S. Cl.
CPC ........... *A01D 34/74* (2013.01); *A01D 34/008* (2013.01); *A01D 34/64* (2013.01); *A01D 75/18* (2013.01); *A01D 2101/00* (2013.01)

(58) Field of Classification Search
CPC ...... A01D 34/74; A01D 34/008; A01D 34/64; A01D 75/18; A01D 2101/00; A01D 34/412; A01D 34/63; A01D 39/08; A01D 39/18
See application file for complete search history.

(56) References Cited

U.S. PATENT DOCUMENTS

| 4,817,372 A * | 4/1989 | Toda ................. A01D 43/077 |
| | | 56/13.3 |
| 7,117,660 B1 * | 10/2006 | Colens ............. A01D 34/008 |
| | | 56/DIG. 7 |
| 8,234,848 B2 * | 8/2012 | Messina ............ A01D 34/008 |
| | | 56/17.1 |
| 10,034,421 B2 | 7/2018 | Doughty et al. |
| 11,206,759 B2 * | 12/2021 | Gust ................. A01D 34/74 |
| 11,844,301 B1 * | 12/2023 | Lin .................. A01D 34/82 |
| 2009/0000839 A1 * | 1/2009 | Ishii ................. B62D 11/04 |
| | | 701/41 |

(Continued)

FOREIGN PATENT DOCUMENTS

| CN | 110268858 A | 9/2019 |
| CN | 110933986 A | 3/2020 |

(Continued)

OTHER PUBLICATIONS

Swedish Search Report and Office Action for Swedish Application No. 2051332-1 mailed Jun. 4, 2021.

*Primary Examiner* — Arpad Fabian-Kovacs
(74) *Attorney, Agent, or Firm* — Burr & Forman LLP

(57) ABSTRACT

A robotic work tool (1) includes a cutting disk (6), which is rotatable and height adjustable. The robotic work tool (1) is configured to obtain a final desired cutting height of the cutting disk (6); determine a first cutting height, based at least on the final desired cutting height; raise the cutting disk (6) to an elevated position above the first cutting height; start a rotation of the cutting disk (6); and lower the cutting disk (6) to the determined first cutting height.

12 Claims, 4 Drawing Sheets

(56) References Cited

U.S. PATENT DOCUMENTS

| | | | |
|---|---|---|---|
| 2012/0159916 A1* | 6/2012 | Ishii | B60L 1/003 |
| | | | 56/10.2 G |
| 2016/0295797 A1* | 10/2016 | Ito | A01D 34/006 |
| 2017/0280622 A1 | 10/2017 | Yamamura | |
| 2017/0280623 A1 | 10/2017 | Yamamura et al. | |
| 2018/0352730 A1 | 12/2018 | Gorenflo et al. | |
| 2019/0150359 A1 | 5/2019 | Gust et al. | |
| 2019/0387670 A1* | 12/2019 | Matsuda | B60L 50/16 |
| 2020/0170186 A1 | 6/2020 | Curtis | |
| 2020/0214196 A1 | 7/2020 | Madsen et al. | |
| 2022/0007570 A1* | 1/2022 | Foster | A01D 34/78 |
| 2022/0007571 A1* | 1/2022 | Foster | A01D 34/008 |
| 2024/0215480 A1* | 7/2024 | Swartz | A01D 34/68 |

FOREIGN PATENT DOCUMENTS

| | | |
|---|---|---|
| CN | 111887009 A | 11/2020 |
| EP | 2767150 A1 | 8/2014 |
| JP | S5821217 U | 2/1983 |
| JP | 2005176677 A | 7/2005 |
| JP | 2015142515 A | 8/2015 |
| JP | 2016-195545 A | 11/2016 |
| JP | 2017176116 A | 10/2017 |
| JP | 2020-528275 A | 9/2020 |
| WO | 2016150503 A1 | 9/2016 |
| WO | 2020053242 A1 | 3/2020 |

\* cited by examiner

ROBOTIC WORK TOOL WITH HEIGHT ADJUSTABLE CUTTING DISK AND METHOD FOR OPERATING A ROBOTIC WORK TOOL

FIELD OF THE INVENTION

The present invention relates to a robotic work tool comprising a cutting disk, which is rotatable and height adjustable.

The invention also relates to a method for running a robotic work tool.

BACKGROUND

WO2016/150503A1 discloses one example of a robotic work tool, wherein a tool is adapted to be carried by a tool holder in a movable, in particular pivotable, manner. A pin on a cutting disk may be arranged in a round or oblong hole or slit in the tool.

Since the pin is disposed some distance from the center of the cutting disk, the tool is movably arranged on the pin with a certain amount of play in several directions, and the tool is arranged to extend partly outside of the outer edge of the cutting disk, the tool may droop at one end. In such an instance, the drooping end of the tool may hang down from the level of the cutting disk by several millimeters, sometimes even up to 10 mm, when the cutting disk is in a stationary position. The tool may hereby be positioned at an angle to the cutting disk, typically with its outer end hanging down from the level of the cutting disk.

Since the tools, i.e. the knives, tend to extend below the level of the cutting disk, there is a considerable risk that the work may be uneven, and that the lawn etc. may be cut, at least partly, to a lower height than intended and set by the user. Occasionally there is a risk that the tools reach the ground and damage the turf. The problems may be worse at the start and end of a cutting cycle. They may be particularly noticeable if the intended cutting height is very low.

Attempts have been made to solve the problem by fixing the tools rigidly to the cutting disk. Unfortunately, some of the functionalities of the tools, such as their ability to yield to obstacles that cannot be cut, may be lost thereby. Also, the rigid fixing of the tools may in some cases call for a different design of parts barring the access to the cutting disk, in order to comply with safety regulations.

SUMMARY

It is an object of the present invention to solve, or at least mitigate, parts or all of the above mentioned problems. To this end, there is provided a robotic work tool configured to obtain a final desired cutting height of the cutting disk, determine a first cutting height, based at least on the final desired cutting height, raise the cutting disk to an elevated position above the first cutting height, start a rotation of the cutting disk, and lower the cutting disk to the determined first cutting height.

Hereby the outer end of any tools, i.e. knives, that are mounted on the cutting disk may rise to the level of the cutting disk when the cutting disk rotates at a sufficient speed. The centripetal force acting on each tool is proportional to the squared angular velocity thereof and will keep each tool moving along a circular path. By centrifugal action, the mass center of each tool will follow a circular path farther away from the center of the cutting disk as the angular velocity increases. The distance from the mass center of each tool to the center of the disk will be maximised when the mass center of the tool has risen to the level of the cutting disk. In this state the free ends of the tools do not droop from the cutting disk.

In an embodiment the robotic work tool is configured to start the rotation when the cutting disk is in its elevated position.

Hereby the outer, initially drooping, ends of the tools may move from their drooping position to their raised position without contact with the vegetation, e.g. grass, below, and the risk of damaging the ground or making an uneven cut may be eliminated.

In a further embodiment the robotic work tool is configured to lower the cutting disk to the first cutting height after it has obtained its full rotational cutting speed.

Hereby the tools on the cutting disk may be on the same level as the cutting disk when it is lowered, while keeping the advantages of pivotable tools.

In another embodiment the robotic work tool is configured to raise the cutting disk to its elevated position before lowering its rotational speed.

Hereby the risk of damaging the ground or making an uneven cut when the rotational speed is lowered, and the tools start to droop, is eliminated.

In some embodiments the robotic work tool is configured to raise the cutting disk to its elevated position after a cutting session has been completed.

Hereby not only the risk of damaging the ground or making an uneven cut may be eliminated, when the cutting disk is raised and the speed is lowered at the end of the cutting session. Also, the cutting disk may be in the elevated position before the next session is started.

In other embodiments the robotic work tool is configured to raise the cutting disk to its elevated position before a cutting session starts.

Hereby is ensured that the cutting disk is in its elevated position before the cutting starts, even after an extended downtime with a subsequent restart.

In further embodiments the robotic work tool comprises an elevation means E arranged to automatically raise and lower the cutting disk.

Hereby a proper functioning of the robotic work tool may take place without any manual actions taken by the user. The result of the cutting operation will be even and smooth.

In further embodiments the robotic work tool is configured to activate an indicator before the cutting disk is lowered.

Hereby there may be a warning directed to the user before the cutting starts, so that they may make sure that there are no persons or animals in the immediate vicinity of the robotic work tool. This is an extra safety measure to prevent injuries or unpleasant surprises from a sudden movement of the robotic work tool.

In an even further embodiment, the activation of the indicator includes sounding an alarm signal.

Hereby the warning function is further enhanced.

In some embodiments the elevated position is 5-10 mm above the determined first cutting height.

Hereby the tools drooping slightly from the cutting disk may not cut lower than the determined first cutting height before the cutting disk has reached its full rotational cutting speed. The distance is set based on the expected distance that the tools on the cutting disk will extend downwards when the cutting disk is at a stand-still.

In some embodiments the cutting disk includes rotatable knives.

Hereby the tools mounted on the cutting disk may be optimal for cutting, in particular for lawn-mowing. Rotatable knives are an advantageous option since they may yield when the resistance exceeds a predetermined limit. Hereby the robotic work tool risks neither getting stuck on branches etc. on the lawn, nor damaging other vegetation than the lawn. Another advantage with rotatable knives is that they may be arranged with several cutting edges, thereby utilizing the material in the knives maximally.

In some embodiments the robotic work tool is configured to have a regular mode and a low mode and configured to raise the cutting disk to the elevated position in the low mode only.

Hereby is accomplished that the robotic work tool may be used for mowing of lawns at a fairly high level with limited demands for an even cut in the regular mode. In the regular mode there is no need for an elevated cutting disk during the acceleration and deceleration of the cutting disk. In the low mode, the demands for an even cut are higher, and the cutting height is very close to the ground. Hereby there is a need for the advantages that an elevation of the cutting disk during the acceleration and deceleration phases may provide.

In further embodiments the robotic work tool is configured to determine one or more further cutting heights below the first cutting height based at least on the final desired cutting height, determine the elevated position to 5-10 mm above the further cutting height, raising the cutting disk to the elevated position, starting the rotation of the cutting disk, and lowering the cutting disk to the determined further cutting height.

Hereby the robotic work tool may be able to perform the cutting action in several steps, before the final desired cutting height is reached. The elevated position may be decided in relation to the latest determined cutting height, and the elevated position may hence be lowered gradually until the elevated position associated with the final desired cutting height is reached. Hereby the cutting disk may be raised only to a sufficiently elevated position, which may save some time when the robotic work tool is started and stopped.

In a second aspect of the invention, parts, or all, of the above mentioned problems are solved, or at least mitigated, by a method for running the robotic work tool comprising the steps of obtaining an final desired cutting height, determining a first cutting height, based at least on the final desired cutting height, raising the cutting disk to an elevated position above the first cutting height, starting a rotation of the cutting disk, and lowering a cutting disk to the determined first cutting height.

Hereby a lawn etc. without marks from uneven cutting may be obtained.

It is noted that embodiments of the invention may be embodied by all possible combinations of features recited in the claims. Further, it will be appreciated that the various embodiments described for the device are all combinable with the method as defined in accordance with the second aspect of the present invention, and vice versa.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

All the figures are schematic, not necessarily to scale, and generally only show parts which are necessary in order to elucidate the embodiments, wherein other parts may be omitted.

DETAILED DESCRIPTION OF THE EXEMPLARY EMBODIMENTS

Figure 1:
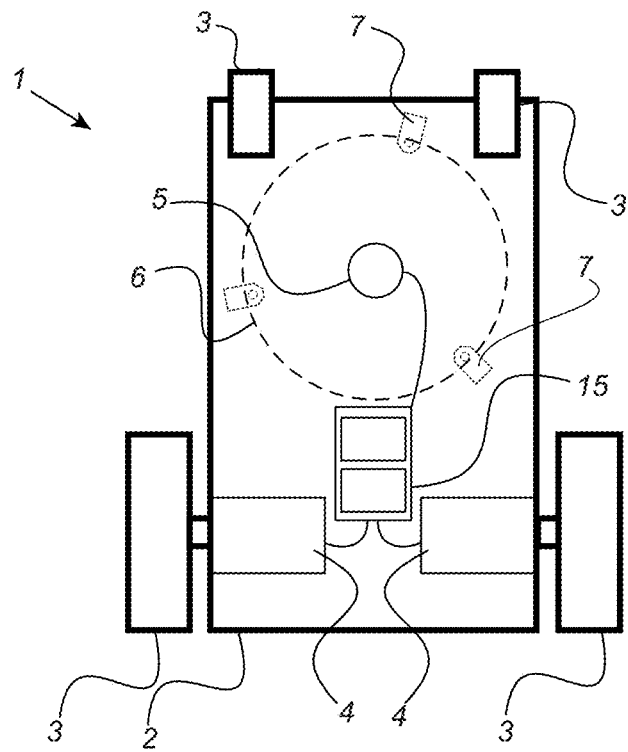
FIG. 1 is a diagrammatic view from above of a robotic work tool according to the disclosure.

FIG. 1 illustrates schematically a robotic work tool 1 as seen from above. The robotic work tool 1 has a chassis 2 with wheels 3 mounted thereon. The robotic work tool 1 further comprises motors 4 for driving the wheels 3 as well as a motor 5 for driving a cutting disk 6. The cutting disk 6 may rotate in either direction, i.e. clockwise and anti-clockwise alternately. A mechanism (not shown) for regulating the height of the cutting disk 6 is provided, so that the distance between the cutting disk 6 and the ground may be regulated.

A number of tools 7 are arranged, preferably evenly spaced, near the periphery of the cutting disk 6. In the embodiments disclosed in the figures, the tools 7 are preferably cutting knives, but other similar types of tools 7 are included in the scope of this patent application.

As the robotic work tool 1 proceeds across a work area, such as a lawn, while the cutting disk 6 rotates, the cutting disk 6 may create a cut path with a width approximately corresponding to the diameter of the cutting disk 6. When the height of the lawn is close to a set height of the cutting disk 6, the cut path may not be clearly visible.

Figure 2A:
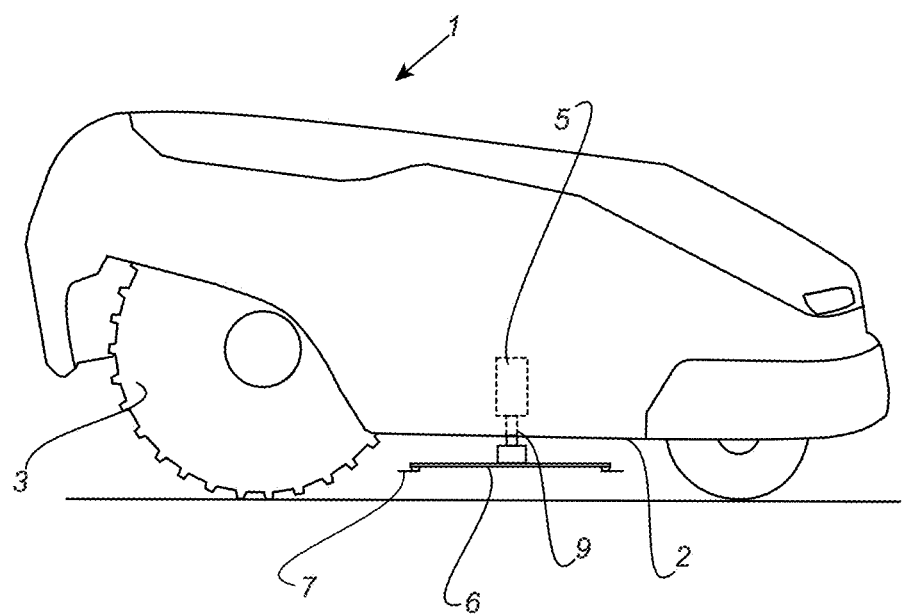
FIG. 2a is a diagrammatic view from the side of the robotic work tool according to the disclosure.
Figure 2B:
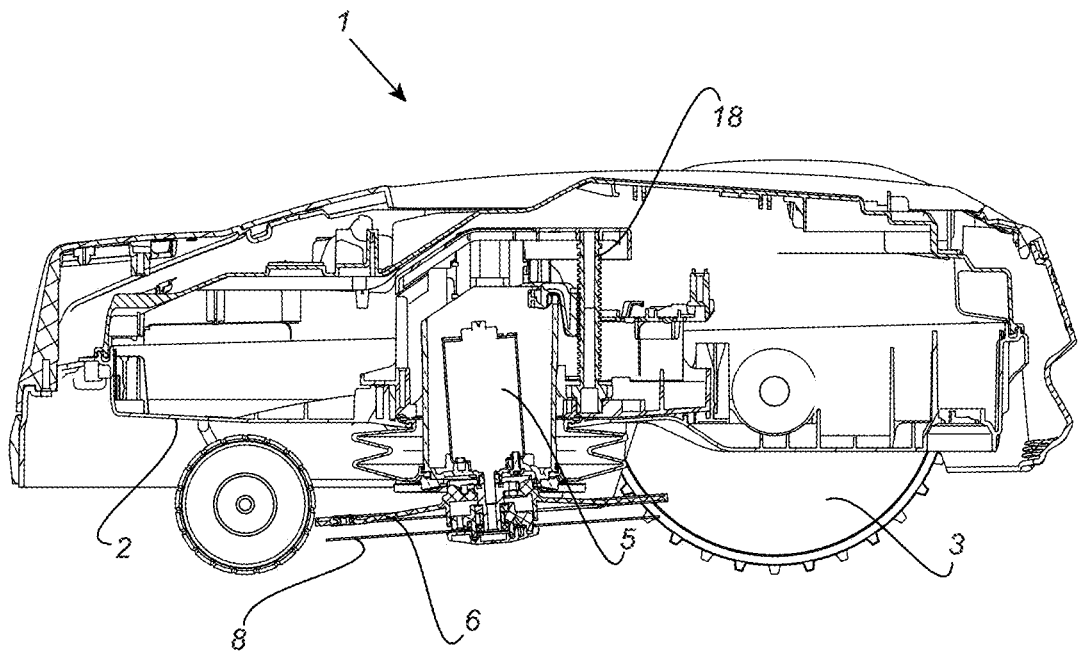
FIG. 2b is a sectional view from the side of the robotic work tool.

When the robotic work tool 1 is seen from the side, as in FIG. 2a, it is clear that the motor 5 driving the cutting disk 6 is positioned above the cutting disk 6, with a drive shaft 9 extending from the motor 5 to the cutting disk 6. The drive shaft 9 may be slightly tilted in relation to the vertical, as seen in FIG. 2b. The cutting disk 6 is arranged to be height adjustable, by an elevation mechanism 18, known as such in the art. The motor 5 may in most cases be arranged to move with the cutting disk 6, when the latter is raised or lowered by the elevation mechanism. Optionally a skid plate 8 (see FIG. 2b) may be arranged below the cutting disk 6.

Raising and lowering the cutting disk 6 may decide the cutting height of the robotic work tool 1. An operator of the robotic work tool 1 may set a desired final cutting height by any input means known in the art. Depending on the configuration of the robotic work tool 1 and the state of the work area, the robotic work tool 1 may determine a first cutting height equal to the desired final cutting height or a first cutting height which is higher than the desired final cutting height. In other words, the desired final cutting height may be reached in a single step or in several, smaller steps.

Figure 3:
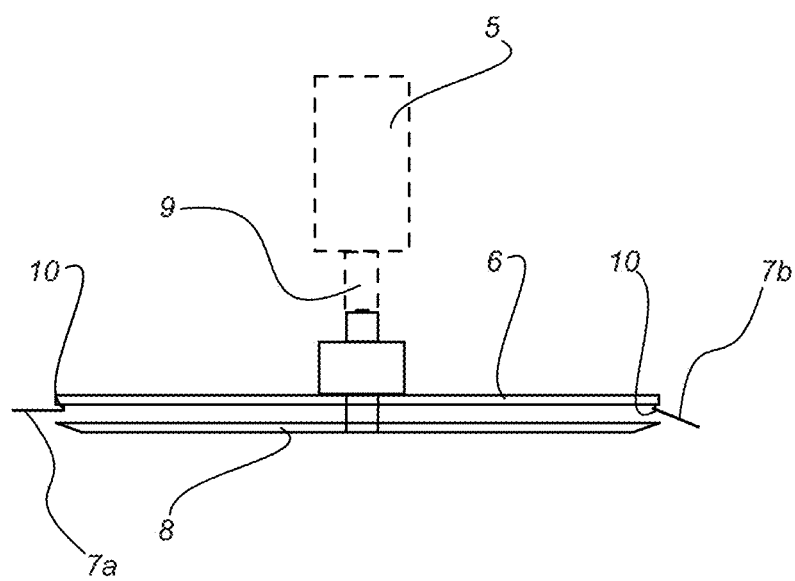
FIG. 3 is a schematic side view of a cutting disk included in the robotic work tool.

In FIG. 3 the cutting disk 6, the motor 5, the drive shaft 9, and the skid plate 8 are shown from the side. Two of the tools 7a, 7b, e.g. knives, are schematically shown at the peripheral edges of the cutting plate 6. The tools 7a, 7b are rotatably arranged on pins 10. The tools 7a, 7b are arranged with a certain clearance on their respective pins 10. In some embodiments, each tool 7a, 7b may even be provided with an elongated slit 12, through which the pin 10 extends (see FIGS. 4a-b). The clearance may allow the tools 7a, 7b to be arranged with a skew on the pin 10, and the outer end of the tool 7b may droop, as suggested in FIG. 3. The skew may be larger if the clearance is larger. The tools 7a, 7b in FIG. 3 are shown in two of the different positions that they may attain, depending on the speed of rotation of the cutting disk 6. It should be noted that the tools 7a, 7b in reality attain the same mutual positions at the same time, and FIG. 3 is merely schematic. The tool 7a to the left has taken the position attained at a high rotational speed, whereas the tool 7b to the right displays the position when the cutting disk 6 is rotating at a low speed or is standing still.

On rotation of the cutting disk 6, the tools 7a, 7b, typically cutting knives, will be subject to their inertia and to the centripetal force exerted by the respective pins 10. The outer, free ends of the knives 7a, 7b may hereby proceed as far from the center of the cutting disk 6 as possible, by centrifugal action, while the inner ends of the knives 7a, 7b remain in the position defined by the pin 10 on the cutting disk 6. The result will be that the outer end of the knife 7a will rise to the level of the cutting disk 6 when the cutting disk 6 rotates.

As seen in FIG. 3, the outer end of the tool 7b is arranged at a level below the level of the cutting disk 6, when the cutting disk 6 is at a stand-still. This is due to the action of gravity and the absence of centrifugal action. When the cutting disk 6 starts to rotate, the outer end of the tool 7a will gradually rise to the level of the cutting disk 6. The consequence of the varying height above the ground as the rotational speed of the cutting disk 6 varies is that the robotic work tool 1 may risk making uneven cuts, or cut into the ground, since the cutting height is depending on the speed at each moment.

In connection with the start of a cutting cycle, the cutting disk 6 may accelerate and pass through all the rotational speeds between a complete standstill and the full speed. At the end of a cutting cycle the speed may in a corresponding way be gradually reduced, and the tools 7a, 7b may be gradually lowered. Hence the level of the tool 7a is predictable when the cutting disk 6 rotates at full speed, since the outer ends of the tool 7a may then be at the same level as the cutting disk 6, or at least at a constant level.

Figure 4A:
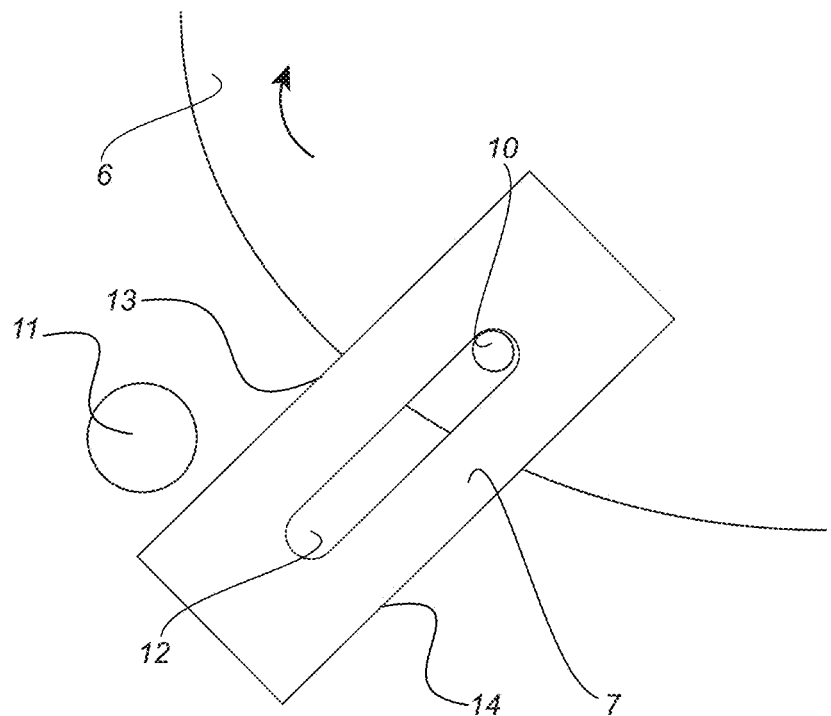
FIGS. 4a-b are partial views of the cutting disk and a knife disposed thereon.
Figure 4B:
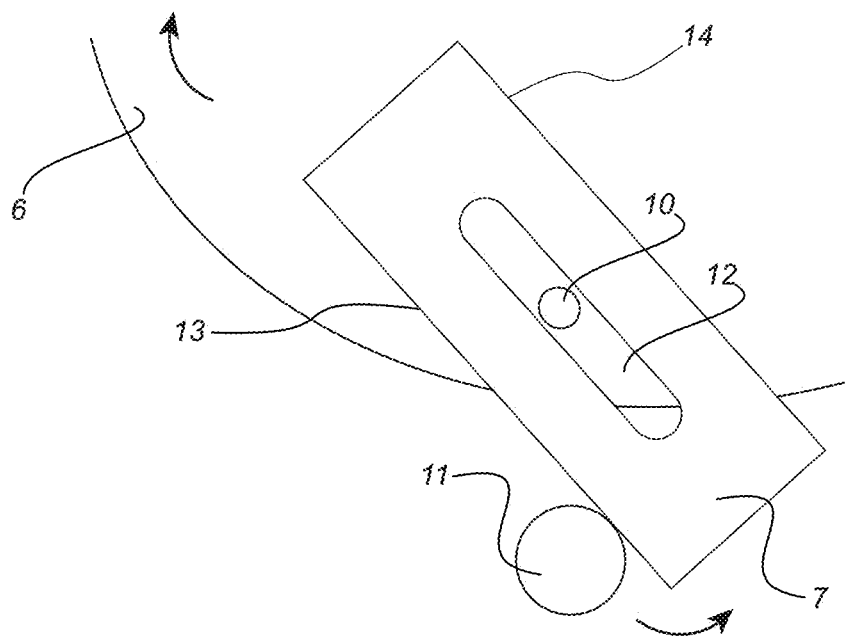

FIGS. 4a and 4b disclose a tool 7, i.e. a knife, with a slit 12. Since the slit 12 is elongate and the clearance between the knife 7 and the pin 10 is large at least in one direction, the tendency of the knife 7 to droop below the level of the cutting disk 6 is pronounced. In order to prevent an uneven cut in areas where the demand for precision is high, the cutting disk 6 should be positioned at an elevated level and not be lowered until the knives 7 extend at the level of the cutting disk 6, i.e. when the cutting disk 6 rotates at full speed.

The advantages of the disclosed knife 7 is that it may rotate, as shown in FIG. 4, in case of contact with an obstacle 11, such as a branch that is too thick to be cut. Since the knife 7 easily rotates on contact, it is less likely to get stuck on such obstacles. Also, the rotation of the knife 7 may in some cases result in a complete turning of the knife 7, so that the previously leading edge 13 may be the trailing edge 14 and vice versa. A rotation or turning of the knife 7 may also take place when the cutting disk 6 starts rotating in a reverse direction. Since the knives 7 may turn at random points in time, the wear of the edges 13,14 may be uniform.

Figure 5:
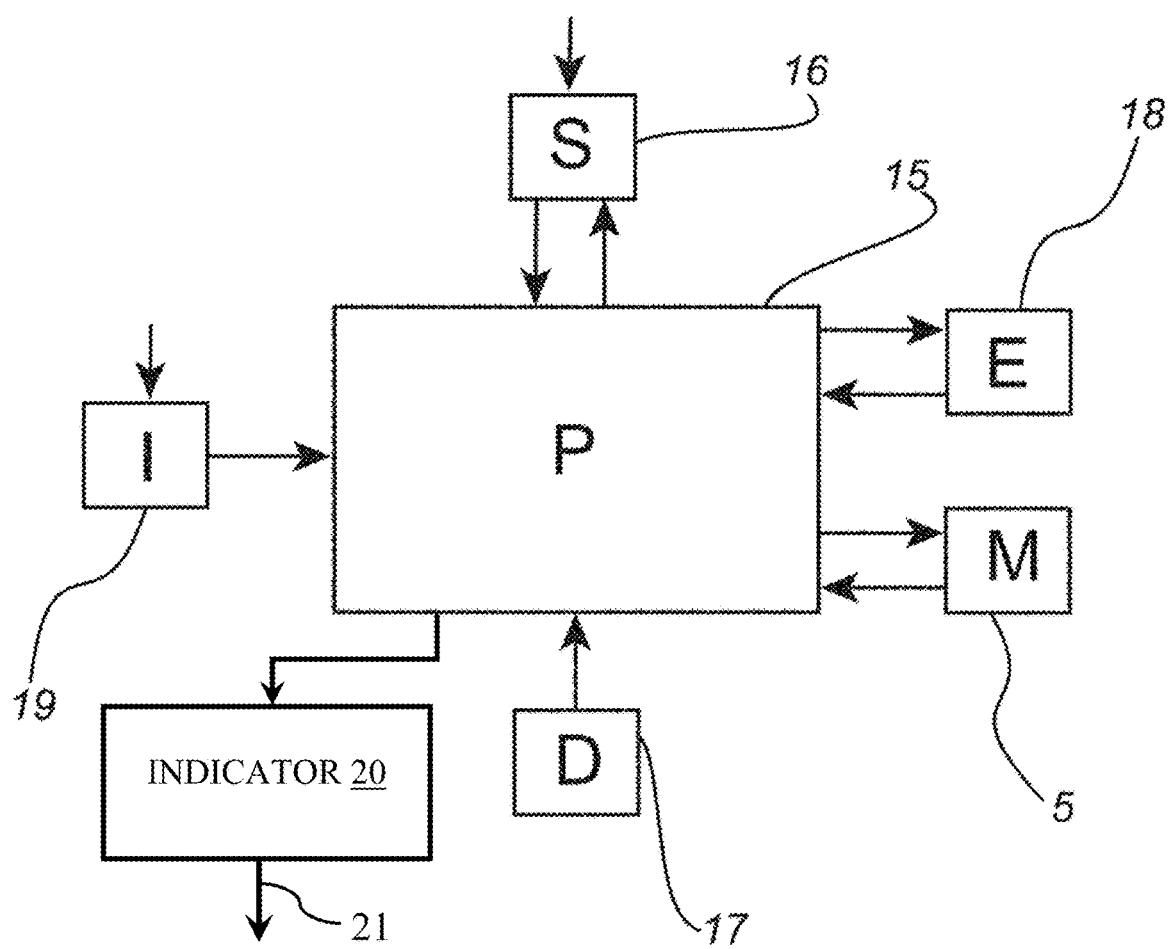
FIG. 5 is a schematic view of the functional units included in the robotic work tool according to the disclosure.

FIG. 5 discloses a general configuration of the robotic work tool 1, in the form of a block diagram. The robotic work tool 1 comprises at least start/stop means S 16, which may be an electric switch etc., and which may be switched on and off by a user. When the robotic work tool 1 has been switched on, it may be possible for the user to input a desired final cutting height via the input means 19. The value of the desired final cutting height may be sent to a processor P 15, which may also receive information from various detection means D 17, e.g. about the present height of the vegetation in the work area, weather conditions etc. The processor P 15 may then calculate a determined first cutting height based at least on the desired final cutting height, and possibly other factors that are considered relevant. In some cases, the result of the calculations may be that the determined first cutting height is equal to the desired final cutting height. In other cases, the processor P 15 may calculate the determined first cutting height as higher than the desired final cutting height, i.e. the robotic work tool 1 may have to process the work area in several steps with a gradually lowered determined cutting height. The processor P 15 may be configured to activate an indicator 20 before the cutting disk 6 is lowered. The activation of the indicator 20 may include sounding an alarm signal 21 to alert the user before the cutting disk 6 is lowered.

Based on the determined cutting height, the processor P 15 is configured to calculate a suitable elevated height of the cutting disk 6, preferably 5-10 mm above the determined cutting height. The distance between the elevated height and the determined cutting height may be equal to or slightly larger than the maximum distance that the tools 7 on the cutting disk 6 may droop below the level of the cutting disk 6.

Instructions of the calculated elevated height may be sent to an elevation means E 18, which is configured to automatically adjust the height of the cutting disk 6, when instructed, by the processor P 15, to do so. The motor M 5 is configured to receive instructions from the processor P 15 to start the rotation of the cutting disk 6, when the elevation means E 18 confirms that the elevated height has been attained. The processor P 15 is further configured to receive information of the rotational speed of the cutting motor M 5 and to instruct the elevation means E 18 to lower the cutting disk 6 as soon as the rotational speed is sufficient, i.e. when the outer ends of the tools 7 on the cutting disk 6 may be safely assumed to have risen to the level of the cutting disk 6.

The processor P 15 may be configured to direct the robotic work tool 1 in the work area during a cutting cycle according to the knowledge in the field, and the detection means D 17 may be configured to collect and forward the necessary information to the processor P 15, until the whole area has been processed to the determined first cutting height. The processor P 15 may also be configured to determine if the desired final cutting height has been attained. If not, the processor P 15 may be configured to calculate another determined cutting height, another elevated height based thereon, and send corresponding instructions to the elevation means E 18 and the cutting motor M 5, as described above.

The processor P 15 may further be configured to instruct the elevation means E 18 to raise the cutting disk 6 to the elevated height previously calculated, when a cutting cycle is finished, or if the robotic work tool 1 needs to be recharged before continuing the cutting cycle. After the elevation means E 18 has raised the cutting disk 6, the cutting motor M 5 may be instructed by the processor P 15 to decelerate and stop the rotation of the cutting disk 6. The processor P 15 is configured to activate the start/stop means S 16, if the processor P 15 has determined that no more cutting cycles are necessary, i.e. that the desired final cutting height has been reached, so that the robotic work tool 1 may be stopped.

The invention has mainly been described above with reference to a few embodiments. However, as is readily appreciated by a person skilled in the art, other embodiments than the ones disclosed above are equally possible within the scope of the invention, as defined by the appended patent claims.

In the claims, the word "comprising" does not exclude other elements or steps, and the indefinite article "a" or "an" does not exclude a plurality.

The invention claimed is:

1. A robotic work tool comprising a cutting disk, which is rotatable and height adjustable, the robotic work tool being configured to:
   obtain a final desired cutting height of the cutting disk;
   determine a first cutting height, based at least on the final desired cutting height;
   raise the cutting disk to an elevated position above the first cutting height;
   start a rotation of the cutting disk while the cutting disk is in the elevated position; and
   lower the cutting disk to the determined first cutting height, in response to the cutting disk has obtained a substantially full rotational cutting speed.

2. The robotic work tool according to claim 1, wherein the robotic work tool is configured to raise the cutting disk to the elevated position before lowering a rotational speed of the cutting disk.

3. The robotic work tool according to claim 1, wherein the robotic work tool is configured to raise the cutting disk to the elevated position after a cutting session has been completed.

4. The robotic work tool according to claim 1, wherein the robotic work tool is configured to raise the cutting disk to the elevated position before a cutting session starts.

5. The robotic work tool according to claim 1, wherein the robotic work tool comprises an elevation means arranged to automatically raise and lower the cutting disk.

6. The robotic work tool according to claim 1, wherein the robotic work tool is configured to activate an indicator before the cutting disk is lowered.

7. The robotic work tool according to claim 6, wherein activation of the indicator includes sounding an alarm signal.

8. The robotic work tool according to claim 1, wherein the elevated position is 5-10 mm above the determined first cutting height.

9. The robotic work tool according to claim 1, wherein the cutting disk includes rotatable knives.

10. The robotic work tool according to claim 1, wherein the robotic work tool is configured to have a regular mode and a low mode and configured to raise the cutting disk to the elevated position in the low mode only.

11. The robotic work tool according to claim 1, wherein the robotic work tool is configured to:
    determine one or more further cutting heights below the first cutting height based at least on the final desired cutting height;
    determine the elevated position to 5-10 mm above the further cutting height;
    raise the cutting disk to the elevated position;
    start the rotation of the cutting disk; and
    lower the cutting disk to the determined further cutting height.

12. A method for running a robotic work tool, comprising the steps of:
    obtaining a final desired cutting height;
    determining a first cutting height, based at least on the final desired cutting height;
    raising a cutting disk to an elevated position above the first cutting height;
    starting a rotation of the cutting disk while the cutting disk is in the elevated position; and
    lowering the cutting disk to the determined first cutting height, in response to the cutting disk has obtained a substantially full rotational cutting speed.

* * * * *